C. BOUILLON.
MACHINE TOOL DRIVING MECHANISM.
APPLICATION FILED JUNE 3, 1920.
1,407,834.
Patented Feb. 28, 1922.
2 SHEETS—SHEET 2.
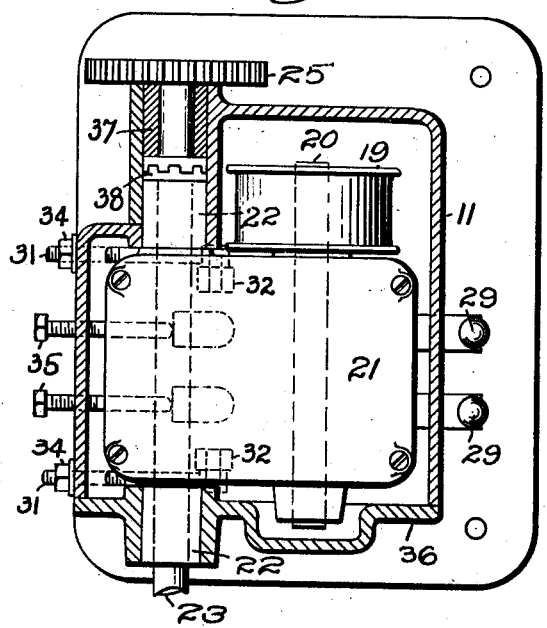
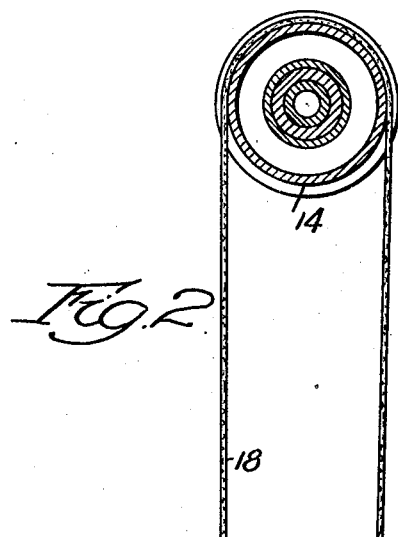
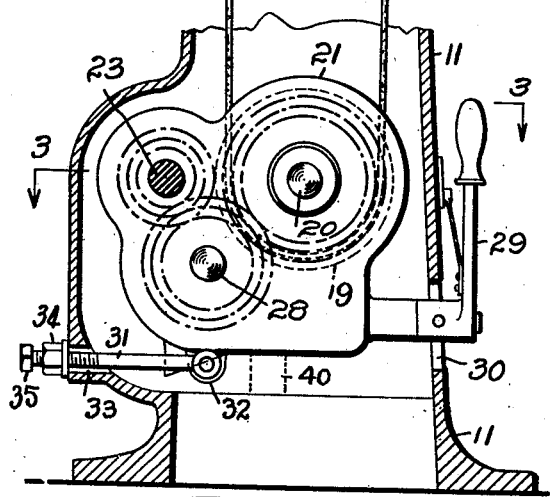
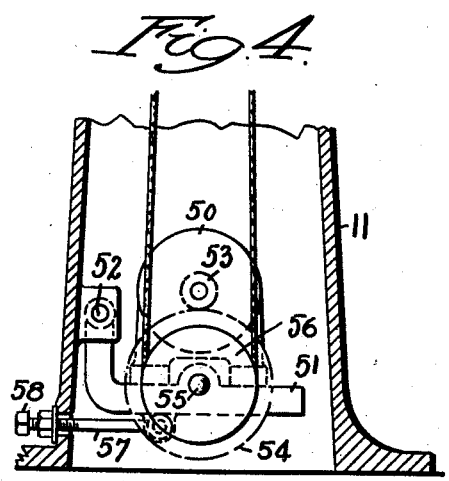
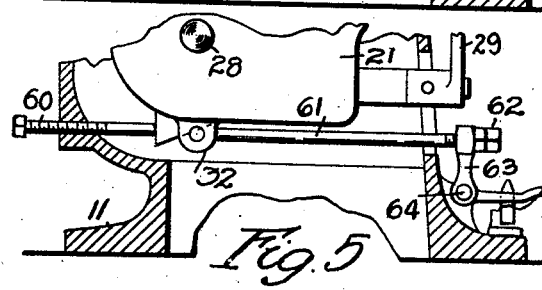
Inventor
Constant Bouillon.
By attorneys
Southgate & Southgate

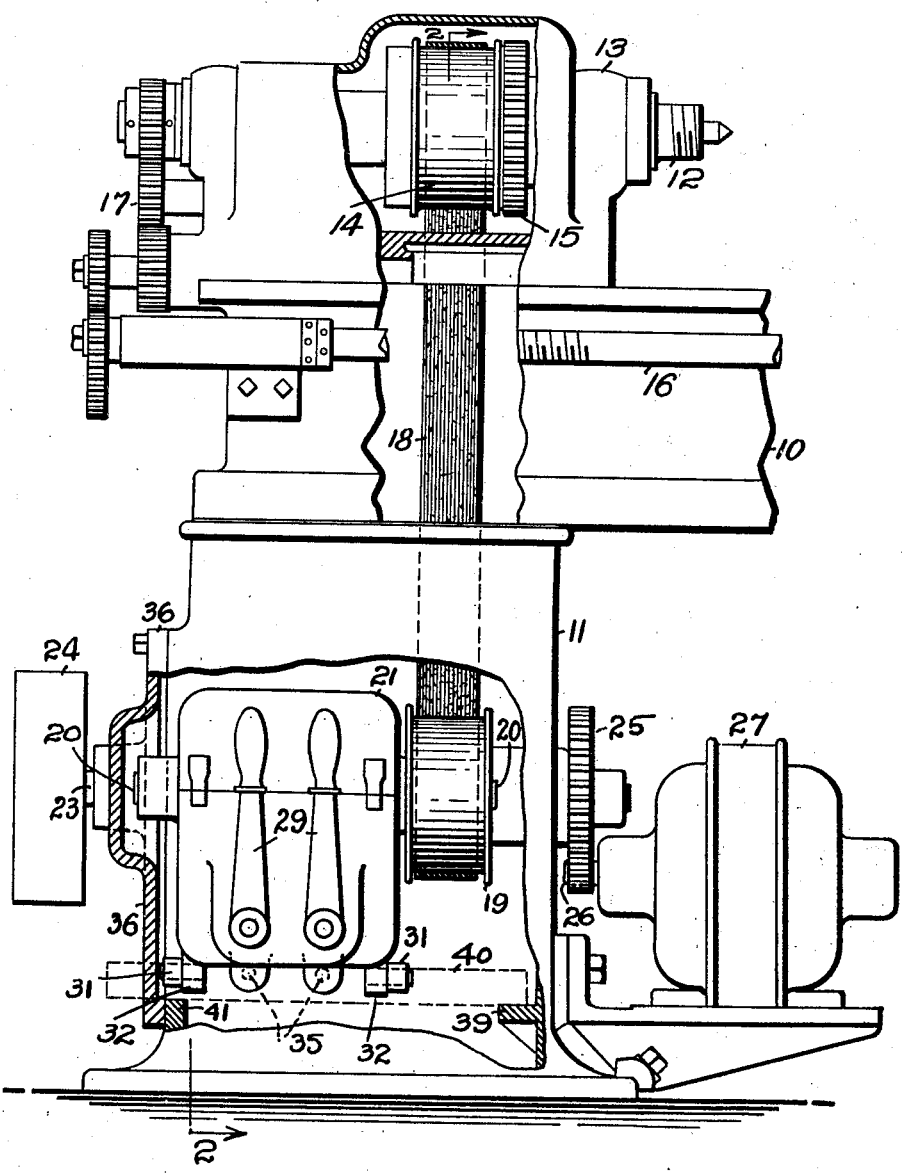

UNITED STATES PATENT OFFICE.

CONSTANT BOUILLON, OF TORRINGTON, CONNECTICUT, ASSIGNOR TO HENDEY MACHINE COMPANY, OF TORRINGTON, CONNECTICUT, A CORPORATION OF CONNECTICUT.

MACHINE-TOOL DRIVING MECHANISM.

1,407,834.  Specification of Letters Patent.  Patented Feb. 28, 1922.

Application filed June 3, 1920. Serial No. 386,399.

*To all whom it may concern:*

Be it known that I, CONSTANT BOUILLON, a citizen of the United States, residing at Torrington, in the county of Litchfield and State of Connecticut, have invented a new and useful Machine-Tool Driving Mechanism, of which the following is a specification.

This invention relates to driving mechanism suitable for a lathe or other machine tool.

Under some conditions of operation it is found exceedingly desirable to provide a belt drive to the spindle on which the work is supported, as less vibration is transmitted through a belt than through a gear drive.

It is one object of my invention to provide an improved self-contained belt drive for a machine tool, the belt preferably running on a single pulley on the machine spindle.

Another object is to provide a construction in which the driving mechanism is mounted in the base or pedestal of the machine in such manner that the tension of the driving belt may be easily adjusted.

More specifically, my invention comprises change speed mechanism pivotally mounted in the base of the machine and movable as a unit about its pivot to vary the belt tension.

A further feature of my invention consists in so constructing the change speed mechanism that it is removable as a unit from the machine without disturbing or dismantling other parts of the machine.

My invention further relates to certain arrangements and combinations of parts which will be hereinafter described and more particularly pointed out in the appended claims.

A preferred form of my invention, together with a modification thereof, is shown in the drawings, in which Fig. 1 is a front elevation of the head portion of a machine embodying my invention, certain parts being broken away;

Fig. 2 is a sectional side elevation, taken along the line 2—2 in Fig. 1;

Fig. 3 is a sectional plan view, taken along the line 3—3 in Fig. 2;

Fig. 4 is a partial sectional side elevation of a modification;

Fig. 5 is a similar view of a second modification; and

Fig. 6 is a front view of a part shown in Fig. 5.

In the drawings I have shown my improvement as embodied in an engine lathe having a bed 10, a base 11, and a spindle 12 rotatably mounted in bearings in a head stock 13. A belt pulley 14 is mounted to rotate about the axis of the spindle 12 and is normally connected directly to said spindle. The usual back gears 15 may be provided for securing a reduction of speed and an increase in power if desired. The lathe also includes the usual lead screw 16 and gear train 17, all of which parts may be of any usual and suitable construction.

The base 11, bed 10 and head stock 13 constitute, in effect, a hollow pedestal through which a driving belt 18 extends with substantially vertical runs from a pulley 19 in the base of the machine to the pulley 14 on the spindle 12. The pulley 19 is shown herein as mounted on a shaft 20, having suitable bearings in a change gear box 21. The box 21 is provided with extensions or trunnions 22, supported in bearings in the base 11 and concentric with a driving shaft 23.

Power is applied to the shaft 23 in any convenient manner, as through a pulley 24, or through a gear 25 meshing with a pinion 26 on the armature shaft of a motor 27. The change gear connections between the driving shaft 23 and the shaft 20 are not shown in detail herein and any suitable chain gear mechanism may be used for connecting these two shafts. One form of such change gear mechanism embodies a third shaft 28, connected by suitable sliding gears with the shafts 23 and 20. This particular mechanism forms the subject matter of my companion application, Serial No. 402,811, filed August 11, 1920.

One or more gear shift handles 29 project through an opening 30 in the front of the base 11. Eye-bolts 31 are connected to lugs 32 at the under side of the gear box 21 and extend rearward through openings 33 in the base 11. By tightening the nuts 34 on the eye bolts 31, additional tension may be placed upon the belt 18.

Adjusting screws 35 are also threaded in the rear side of the base 11 and engage projections on the gear box 21 to swing the box upward to relieve the tension. By use of the adjusting nuts 34 and the adjusting screws 35, the gear box may be located in any desired position and may be rigidly held in such position.

I have thus provided convenient and efficient driving connections between the driving shaft 23 rotating at a definite speed in fixed bearings and the belt driven spindle 11, said connections including means for varying the speed of the spindle within wide limits.

I have also made special provision for convenient insertion and removal of the change gear mechanism. For this purpose, I provide the base 11 with a removable side section 36, supporting one of the bearings for the gear box 21, the other bearing being supported by the opposite permanent side of the base 11.

When the motor drive is used, I also preferably connect the gear 25 with the shaft 23 by the clutch mechanism shown in Fig. 3, one clutch portion 37 being adjustably mounted in the base 11 and rotating with the gear 25 while the other clutch portion 38 is fixed to the shaft 23 and is removable therewith.

I also provide a shelf or flange 39 (Fig. 1), adapted to support the rear end of a bar 40 which may be temporarily placed in position after the side section 36 is removed, the bar resting upon the flange 39 and also upon the edge 41 of the opening in the base 11. The bolts 31 may then be loosened and removed and the entire gear box may be easily slipped from the base and as easily replaced.

If the pulley 24 only is used for driving the shaft 23, the clutch members 37 and 38 may, of course, be omitted.

In Fig. 4 I have shown a somewhat similar construction embodying the use of a variable speed motor 50 instead of the change gear box 21. The motor 50 is mounted upon a support or platform 51 pivoted at 52 to the base 11 and preferably connected by a pinion 53 and gear 54 to a shaft 55, also supported in bearings on the platform 51 and having a pulley 56 corresponding to the pulley 19 previously described. Eye-bolts 57 and adjusting screws 58 provide for adjustment of the belt tension as in the preferred form.

In Figs. 5 and 6, I have shown a modified belt tension mechanism. In this construction, adjusting screws 60, corresponding to the screws 35 in Fig. 2, limit downward movement of the change gear box and the belt tension is produced by the wieght of the gear box. A bolt 61 is pivoted to the gear box and extends through the front of the base. At its outer end, a bolt is provided with nuts 62, engaged by a foot lever 63 pivoted at 64 to the base of the machine. A latch 65 catches the lever 63 when the latter is depressed and holds the weight of the gear box off of the belt 18 when the machine is idle.

Having thus described my invention, it will be seen that I have provided an exceedingly simple and practical self-contained belt drive for a lathe or other similar machine tool and that I have provided for variations in speed, for convenient adjustment of the belt tension, and for easy removal of the driving mechanism for inspection or repairs.

It will be further evident that additional changes and modifications can be made in my invention by those skilled in the art within the spirit and scope thereof as set forth in the claims and I do not wish to be otherwise limited to the details herein disclosed, but what I claim is:—

1. Driving mechanism for a machine tool having a spindle and a hollow upwardly extending support for said spindle, comprising a pulley to rotate said spindle, a driving shaft mounted in fixed bearings in the base of said support, change speed mechanism connected to said shaft and mounted to swing as a unit about the axis of said shaft, a driving pulley rotated by said change speed mechanism and mounted thereon eccentric to said driving shaft, and a belt disposed within said support and connecting said two pulleys by substantially vertical runs, said belt being tightened by downward angular movement of said change speed mechanism about its pivot.

2. Driving mechanism for a machine tool having a spindle and a hollow upwardly extending support for said spindle, comprising a pulley to rotate said spindle, a driving shaft mounted in fixed bearings in the base of said support, change speed mechanism connected to said shaft and mounted to swing as a unit about the axis of said shaft, a driving pulley rotated by said change speed mechanism and mounted thereon eccentric to said driving shaft, a belt disposed within said support and connecting said two pulleys by substantially vertical runs, and means to adjust the angular position of said change speed mechanism.

3. In a machine tool having a spindle, in combination, a base with a removable side, a driving shaft, a change speed mechanism constructed as a unit and mounted to swing about a bearing in said removable side and about another aligned bearing in the opposite fixed side of said base, said bearings being concentric with said driving shaft, pulleys for said change gear mechanism and for said spindle, and a belt within said base connecting said pulleys by substantially vertical runs and tightened by angular movement of said change gear mechanism as a unit about its bearings.

4. In a machine tool having a spindle, in combination, a pedestal with a removable side, a motor mounted outside of said pedestal, a clutch member driven thereby and extending into a bearing in said pedestal, a driving shaft having bearings aligned with said clutch member, a second clutch member secured to said driving shaft and co-operating with said first clutch member, and change gear mechanism angularly movable about the axis of said driving shaft and driven thereby, said change gear mechanism being belt-connected to said spindle.

5. Driving mechanism for a machine tool having a spindle and a hollow upwardly extending support for said spindle, comprising a pulley to rotate said spindle, a driving shaft mounted in fixed bearings in the base of said support, change speed mechanism connected to said shaft and mounted to swing as a unit about the axis of said shaft, a driving pulley rotated by said change speed mechanism and mounted thereon eccentric to said driving shaft, a belt disposed within said support and connecting said two pulleys by substantially vertical runs, means to swing said change speed mechanism upward and means to hold said mechanims positively in raised position.

In testimony whereof I have hereunto affixed my signature.

CONSTANT BOUILLON.